US005659368A

United States Patent [19]
Landis

[11] Patent Number: 5,659,368
[45] Date of Patent: Aug. 19, 1997

[54] AUXILIARY VIDEO INFORMATION SYSTEM INCLUDING EXTENDED DATA SERVICES

[75] Inventor: Michael David Landis, Fishers, Ind.

[73] Assignee: Thomson Consumer Electronics, Inc., Indianapolis, Ind.

[21] Appl. No.: 302,802

[22] PCT Filed: Apr. 28, 1993

[86] PCT No.: PCT/US93/03988

§ 371 Date: Sep. 15, 1994

§ 102(e) Date: Sep. 15, 1994

[87] PCT Pub. No.: WO93/22876

PCT Pub. Date: Nov. 11, 1993

[30] Foreign Application Priority Data

Apr. 28, 1992 [GB] United Kingdom ............... 9209147

[51] Int. Cl.$^6$ ................................................. H04N 7/087
[52] U.S. Cl. ........................... 348/467; 348/476; 348/478
[58] Field of Search ................................ 348/478, 476, 348/473, 906, 461, 463, 465, 467, 468, 469, 563, 569; H04N 7/087, 7/088

[56] References Cited

U.S. PATENT DOCUMENTS

| | | | |
|---|---|---|---|
| 4,203,130 | 5/1980 | Doumit et al. | 348/97 X |
| 4,706,121 | 11/1987 | Young | 348/906 X |
| 4,862,268 | 8/1989 | Campbell et al. | 348/463 |
| 5,210,611 | 5/1993 | Yee et al. | 358/191.1 |
| 5,260,788 | 11/1993 | Takano et al. | 348/478 |
| 5,343,239 | 8/1994 | Lappington et al. | 348/12 |

FOREIGN PATENT DOCUMENTS

| | | |
|---|---|---|
| 0096381 | 12/1983 | European Pat. Off. . |
| 337336B1 | 10/1989 | European Pat. Off. ........ H04N 7/087 |
| 0447968 | 9/1991 | European Pat. Off. . |
| 0488379 | 6/1992 | European Pat. Off. . |
| 0503070 | 9/1992 | European Pat. Off. . |

OTHER PUBLICATIONS

Federal Communications Commission (FCC), 47 CFR CH.I PAR. 73.682 10 Jan. 1992, pp. 192–198 "TV Transmission Standards".

European Broadcasting Union. Tech. 3262–E, Aug. 1990, Geneva pp. 1–44 "Specification of the Domestic Video Programme Delivery Control System (PDC)".

Rpt. E–7709–C Television Captioning for the Deaf: Signal and Display Specifications—J. Lentz et al, Revised May 1980.

Draft/North American Broadcast Teletext Specification (NABTS) © Sep. 20, 1963—EIA/CVCC.

Television Data System for Program Identification by D.K. Broberg Apr. 12, 1992, NAB 1992 Broadcast Engineering Conf. Proceedings.

Decoder IC For An Automatic Video Program Identification System (VPS) By Xaver Meindl, et al.—IEEE Transaction on Consumer Electronics, vol. CE–32 Aug. 1986.

Videotext Programs Video Home Sets (VPV)$^1$–vol. 30 (1986).

Rundfunktechnische Mitteilungen, 1985 by Heller, "VPS–A New System for Presentation Controlled Program Recording".

Primary Examiner—John K. Peng
Assistant Examiner—Nathan J. Flynn
Attorney, Agent, or Firm—Joseph S. Tripoli; Peter M. Emanuel; Robert D. Shedd

[57] ABSTRACT

A system for processing auxiliary video signals provides for decoding an extended data services signal in line 21 of field 2. Extended data services provide a general purpose video system information and control capability in addition to basic closed caption operation. Extended data services information is arranged in packets of data. Each packet provides information regarding current of future video programs, the source of the video program, and miscellaneous information such as time of day. The extended data services data may be decoded to control the operation of a video system including a videocassette recorder (VCR) and a television receiver.

40 Claims, 5 Drawing Sheets

| OCCURRENCE OF LINE 21, FIELD 2 | CHAR #1 | CHAR #2 | EDS PACKET |
|---|---|---|---|
| 1 | CC/TEXT INFORMATION | CC/TEXT INFORMATION | |
| 2 | CC/TEXT INFORMATION | CC/TEXT INFORMATION | |
| 3 | 04h = EDS CONTROL CODE FUNCTION: START PACKET CLASS: FUTURE PROGRAM | 01h = EDS TYPE CODE TYPE: PROGRAM IDENTIFIER | START A |
| 4 | 04h = EDS DATA: MINUTE = 0 | 48h = EDS DATA: HOUR = 8 | A |
| 5 | CC/TEXT INFORMATION | CC/TEXT INFORMATION | |
| 6 | CC/TEXT INFORMATION | CC/TEXT INFORMATION | |
| 7 | CC/TEXT INFORMATION | CC/TEXT INFORMATION | |
| 8 | 01h = EDS CONTROL CODE FUNCTION: START PACKET CLASS: CURRENT PROGRAM | 08h = EDS TYPE CODE TYPE: CAPTION SERVICES | START B |
| 9 | 4Ch = EDS DATA ENGLISH CAPTIONING AVAILABLE IN CHANNEL 1 OF FIELD 2 | 4Bh = EDS DATA ENGLISH TEXT AVAILABLE IN CHANNEL 2 OF FIELD 1 | B |
| 10 | 03h = EDS CONTROL CODE FUNCTION: END PACKET CLASS: CURRENT PROGRAM | CHECKSUM | END B |
| 11 | 05h = EDS CONTROL CODE FUNCTION: CONTINUE PACKET CLASS: FUTURE PROGRAM | 42h = EDS DATA: DAY = 2 (CONTINUATION OF PROGRAM IDENTIFIER INFORMATION) | A |
| 12 | 46h = EDS DATA: MONTH = 6 (CONTINUATION OF PROGRAM IDENTIFIER INFORMATION) | 00h = NULL (NO DATA) | A |
| 13 | 06h = EDS CONTROL CODE FUNCTION: END PACKET CLASS: FUTURE PROGRAM | CHECKSUM | END A |

AUXILIARY VIDEO INFORMATION SYSTEM INCLUDING EXTENDED DATA SERVICES

The present invention relates to the processing of auxiliary video information that may be present in a video signal during vertical blanking and overscan intervals. A video signal typically includes vertical display intervals, or fields, having a plurality of horizontal line intervals, e.g. 262.5 lines per field in NTSC video systems. The beginning of each vertical and horizontal interval is identified by respective vertical and horizontal sync pulses that are included in a composite video signal. A portion of each vertical interval is a vertical blanking interval that is not normally intended for display. In addition, several line intervals adjacent to the vertical blanking period may be within an overscan region of a video display and will not be visible.

The lack of image information intended for display during blanking and overscan intervals makes it possible to insert an auxiliary information component, e.g. teletext or closed caption (CC) data, into these intervals. Closed caption data represents speech or other sounds in the audio portion of the video program. The closed caption data is displayed in a portion of the video display simultaneously with the corresponding video program display to serve as an aid for hearing impaired viewers. Standards such as Federal Communications Commissions (FCC) Regulations define the format for each type of auxiliary information including the location of the information within a vertical interval. For example, the present closed captioning standard (see e.g. 47 CFR §§ 15.119 and 73.682) specifies a closed caption signal must occur during line 21 of field 1 in the format shown in FIG. 1.

Figure 1:
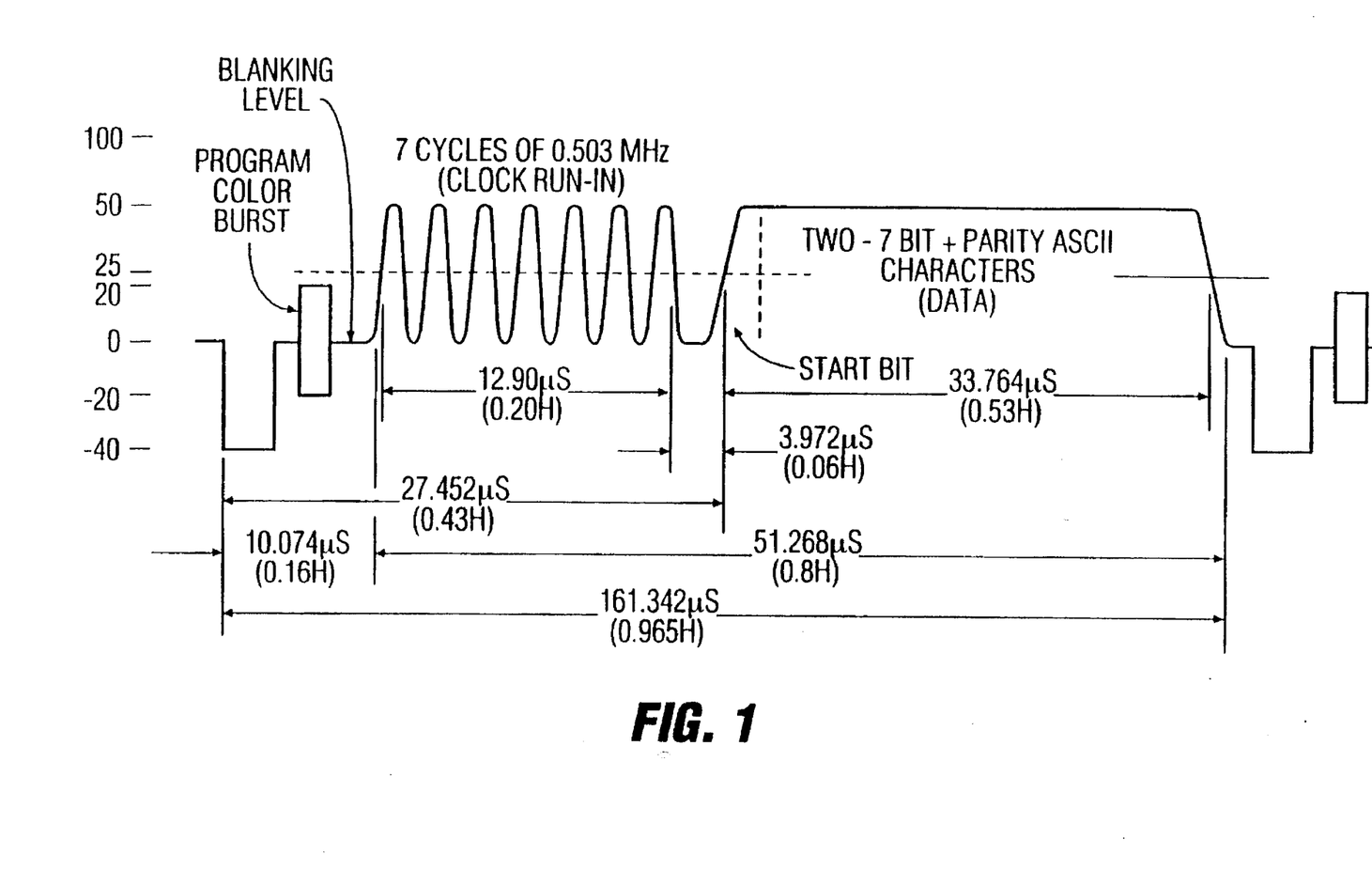
FIG. 1 shows an example of an auxiliary video data signal such as a closed caption or extended data services signal.

Referring to FIG. 1, the closed caption signal includes a run-in clock (RIC) signal that occurs during the first half of line 21. The RIC signal is used as described below to facilitate the extraction of the closed caption data that occurs during a data interval in the last half of line 21. A signal transition at the beginning of a "start bit" interval shown in FIG. 1 indicates the beginning of the data interval. The start bit interval is followed by a signal during the remainder of the data interval that represents 16 bits of binary information. Each of the start bit and binary bit intervals is approximately 2 µs in duration. The 16 binary bits represent two 8-bit character codes in the case of closed caption data. Each character code includes a 7-bit ASCII code and a parity bit.

The FCC standard further specifies that the closed caption signal may include two "channels" of closed caption data designated C1 and C2, and two "channels" of text data designated T1 and T2. Whether data in the closed caption signal is associated with C1, C2, T1, or T2 is determined by control codes that are included in the data. These control codes are listed at 47 CFR §15.119. Two channels of closed caption data make it possible to provide closed captioning in two languages. For example, captioning in English is on C1 and captioning in Spanish is on C2. Because speech is not continuous in a video program, the second language information can be inserted into the closed caption signal during intervals when speech is not occurring. The T1 and T2 text channels provide similar dual-language capability for the display of text that may be unrelated to the audio portion of the video program.

United States law requires that all television receivers 13 inches and larger in size that are sold in the U.S. after 1 Jul. 1993 must be capable of decoding a closed caption signal (see 47 CFR §15.119). This requirement adds to the cost and complexity of most televisions. Many television users, particularly individuals who are not hearing impaired, may not wish to utilize the closed caption capability. Thus, television manufacturers must invest in the development of a feature that is of value to only a limited number of individuals who purchase televisions. In addition, many individuals will be compelled to pay for a feature that is of little or no value to them.

The embodiment of the present invention concerns a system for processing auxiliary video signals that provides for decoding an extended data services (EDS) signal in line 21 of field 2. The EDS signal is transmitted in addition to closed caption information. Extended data services provide a general purpose video system information and control capability. Extended data services information is arranged in packets of data. Each packet provides information regarding current or future video programs, the source of the video program, and miscellaneous information such as time of day. The extended data services data may be decoded to control the operation of a video system including a videocassette recorder (VCR) and a television receiver.

The invention may be better understood by referring to the drawing, in which.

An extended data services (EDS) signal exhibits the same format as the closed caption (CC) signal format that is shown in FIG. 1 and described above. However, an EDS signal occurs during line 21 of each field 2 interval. EDS data provides a variety of information in addition to closed caption information. For example, EDS data may identify a particular current or future program and provide information such as the duration, title, and content of the program. This information may be captured by the video receiver and displayed in response to activation by a user. As an example, a user selecting a program that is in progress may identify the program by causing the title that is extracted from EDS data to be displayed. Alternatively, the a video recorder can be programmed with EDS data to record a particular program.

Figure 2:
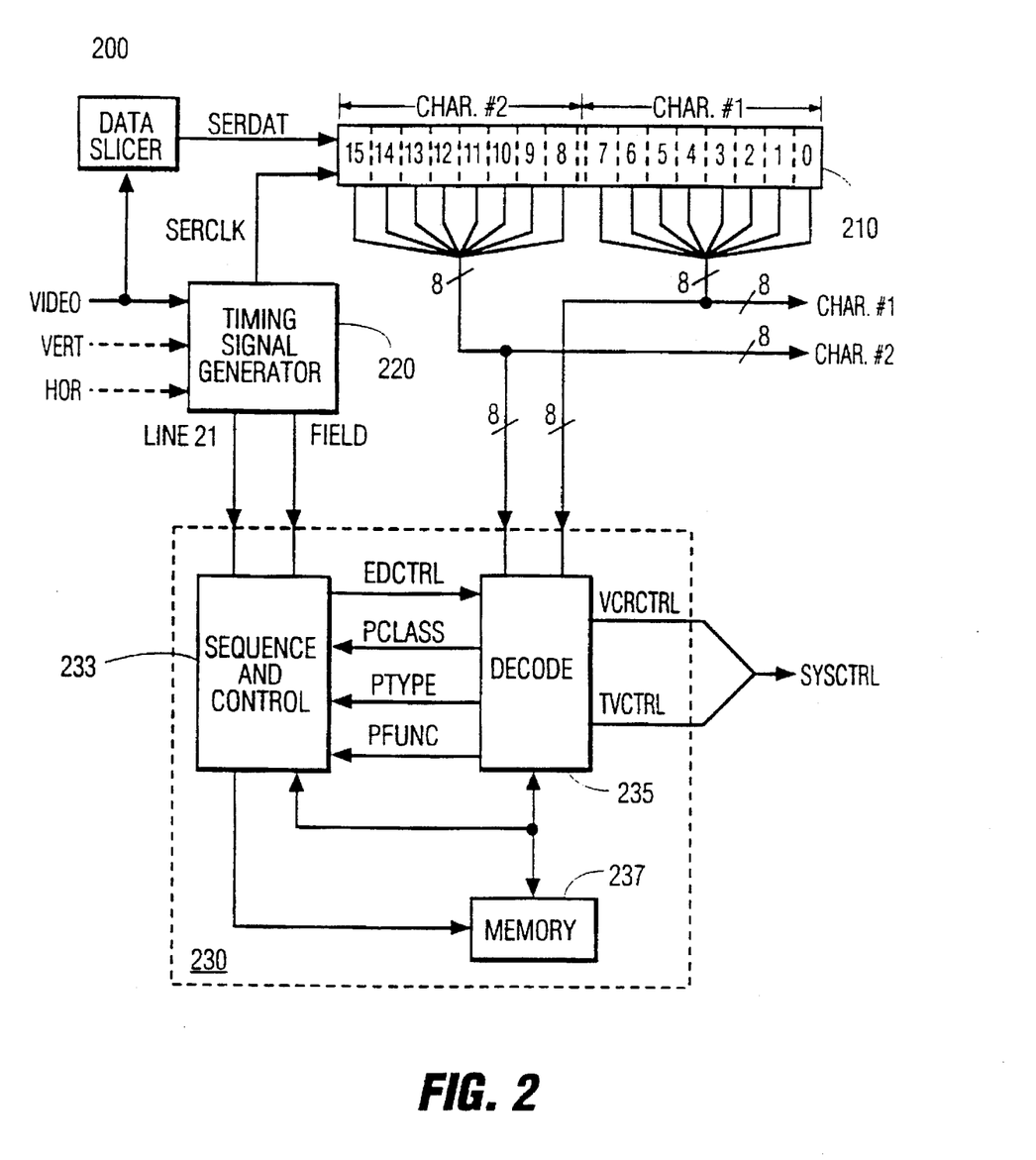
FIG. 2 shows, in block diagram form, a portion of a video signal processing system incorporating a closed caption/extended data services decoder constructed in accordance with an aspect of the invention.

A decoder shown in FIG. 2 decodes CC and EDS data from a video signal. The decoder may be part of a video signal processing integrated circuit. In FIG. 2, composite video signal VIDEO is input to data slicer 200. Data slicer 200 converts closed caption and extended data services information in analog signal VIDEO into serial digital data in signal SERDAT. Data slicer 200 may be implemented, for example, using a comparator that compares the level of signal VIDEO to a threshold level during the data interval in the last half of the line 21 interval (see FIG. 1). The threshold level in data slicer 200 is referred to as the slicing level. Logic 0 and logic 1 levels in signal SERDAT represent levels of signal VIDEO that are less than and exceed, respectively, the slicing level.

The accuracy of data slicing is improved if the slicing level is approximately 50% of the amplitude of the data signal in the last half of the line 21 interval. The run-in clock (RIC) signal in the first half of the line 21 interval (see FIG. 1) may be used to adapt the slicing level to the data signal amplitude. For example, setting the slicing level to the average of the RIC signal amplitude provides an appropriate slicing level because FCC requirements specify that the amplitude of the RIC signal is the same as the data signal amplitude.

The CC or EDS data in signal SERDAT is clocked serially into shift register 210 by a clock signal SERCLK. Signal SERCLK is generated by timing signal generator 220 during the data interval within line 21, i.e., the latter portion of line 21 in which the information representing the 16 data bits occurs (see FIG. 1). Generator 220 determines when line 21 is present in signal VIDEO by counting horizontal lines in the video signal as indicated by horizontal sync pulses in signal VIDEO. The horizontal line count is initialized at the beginning of a video field as indicated by the vertical blanking intervals in signal VIDEO. A sync separator is included in generator 220 to produce a separated sync signal from composite video signal VIDEO that provides the required horizontal and vertical synchronization information. Alternatively, as shown in FIG. 2, signals VERT and HOR from deflection circuitry in a video system could be used for synchronization.

The 16 bits of data in register 210 are designated bits 0 to 15 in FIG. 2. Bits 7–0 represent the first CC or EDS character, CHAR#1, and bits 15–8 represent the second character, CHAR#2. Bits 15 and 7 are the parity bits of the respective characters. The serial data in register 210 is converted to parallel data via 16 parallel outputs from register 210. The parallel data is output to other units in the video system such as an on-screen-display (OSD) processor (not shown in FIG. 2) for generating signals to display closed captioning data and certain types of EDS data (e.g., program title). The parallel data in CHAR#1 and CHAR#2 is also coupled to processing unit 230 for decoding of EDS information.

The format of EDS information is explained in detail below. Briefly, EDS information is arranged in packets of information. Each packet includes a plurality of 8-bit characters from a plurality of occurrences of line 21 of field 2. Each packet represents a complete piece of information that includes both control and data characters.

The control characters identify a particular EDS control function (e.g., start packet, continue packet, or end packet) in a manner that distinguishes EDS information from closed caption information. Because CC data is in line 21 of field 1 and EDS data is in line 21 of field 2, it would appear that distinguishing field 1 from field 2 is sufficient to distinguish CC data from EDS data. However, closed caption service may be improved in certain instances by expanding closed caption data service to line 21 of both fields 1 and 2. For example, the bandwidth of channels C1 and C2 in line 21 of field 1 may be insufficient to provide dual language capability for very rapid speech. Additional bandwidth is provided by defining channels C3 and C4 of closed captioning in line 21 of field 2. Similarly, additional text channels T3 and T4 may be defined in line 21 of field 2. If closed captioning can occur in line 21 of field 2, the EDS data must be distinguishable from closed caption information. This is accomplished as described below by the choice of EDS control characters.

EDS control characters also indicate the class and type of information included in a packet. Packet class designations indicate general classifications of the information included in a packet. For example, a packet class indicates whether the packet contains information pertaining to a future program, the current program, the source of a program (e.g., the broadcast network), or miscellaneous information (e.g., time of day). Each packet class encompasses a plurality of specific types of information. In addition to packet class, EDS control characters also identify the particular type of information in a packet. For example, a packet type of "program title" within the "current program" class indicates that the data characters in the packet represent the title of the current program.

EDS packets may be transmitted repeatedly by the video signal source by making use of all occurrences of line 21 in field 2 that are not being used for other purposes such as closed caption or text data. For example, the current program title might be retransmitted every 2 minutes to ensure that a user can access current program title information with relatively little delay. Other information such as future program data might be transmitted at less frequent intervals or when changes to the program schedule occur.

In FIG. 2, processor 230 includes decoder 233 for detecting and decoding EDS information. The decoding process in decoder 230 is controlled by control unit 233. When line 21 ends as indicated by signal LINE21 from timing generator 230, new character data is present in register 210. If the current video field is field 2, as indicated by signal FIELD from timing generator 230 being at logic 1, the new character data in register 210 may be EDS data. Control unit 233 responds to signals FIELD and LINE21 by generating signal EDCTRL to initiate the decoding process in decoder 235.

Decoder 235 first tests the CHAR #1 code to determine if the character data is EDS data. If CHAR #1 is an EDS control code, decoder 235 proceeds to decode the EDS control information. If CHAR #1 is neither an EDS control code nor a closed caption control code, and the immediately preceding occurrence of line 21 in field 2 included EDS data, the current CHAR #1 code is processed as EDS data. If CHAR #1 is neither an EDS control code nor a closed caption control code, and the immediately preceding occurrence of line 21 in field 2 included closed caption data, the current CHAR #1 code is processed as closed caption data.

If CHAR #1 is an EDS control code, CHAR #1 is decoded to establish the EDS packet function (i.e. start, continue, end) and packet class. As described below, if CHAR #1 indicates "packet start", the CHAR #2 code represents the packet type. The decoded function, class, and type information is communicated to control unit 233 from decoder 235 via signals PFUNC, PCLASS, and PTYPE, respectively. EDS data characters follow "start", "type", and "continue" control characters. Control unit 233 causes the decoded packet control information and data characters to be stored in memory 237 until a complete packet is received as indicated by the EDS control code for the "end packet" function.

The "end packet" control code in CHAR #1 is followed in CHAR #2 by a "checksum" value that is tested in decoder 235 to evaluate whether the data in the packet is error free. If the packet data is error free, subsequent decoding and storage of the packet data that is indicated by the packet class and type information is completed. If the checksum evaluation indicates that the packet data includes an error, the packet data is ignored and a subsequent retransmission of the packet will be captured to provide the correct data.

Decoder 235 generates system control signals SYSCTRL for controlling the aspects of the video system in response to the EDS information. For example, a video cassette recorder (VCR) may be activated to begin recording or set the correct time of day in response to control signal VCRCTRL from decoder 235. Similarly, a television may be controlled via signal TVCTRL to modify the on-screen display (OSD) processor operation to display closed captioning in response to EDS data indicating the presence of closed caption services. Processor 230 in FIG. 2 also includes capability for detecting and decoding closed caption data. Thus, control signals SYSCTRL also include closed caption control signals coupled to the OSD processor that control the closed caption display.

Processor 230 in FIG. 2 may be implemented using a microprocessor. For example, the sequence and control functions of unit 233 could be accomplished with a software control program. Data slicer 200, register 210, and timing signal generator 220 may also be included with the microprocessor function in a single integrated circuit. The operation of an embodiment of the system in FIG. 2 including a microprocessor may be better understood by referring to a flowchart shown in FIG. 3.

Figure 3:
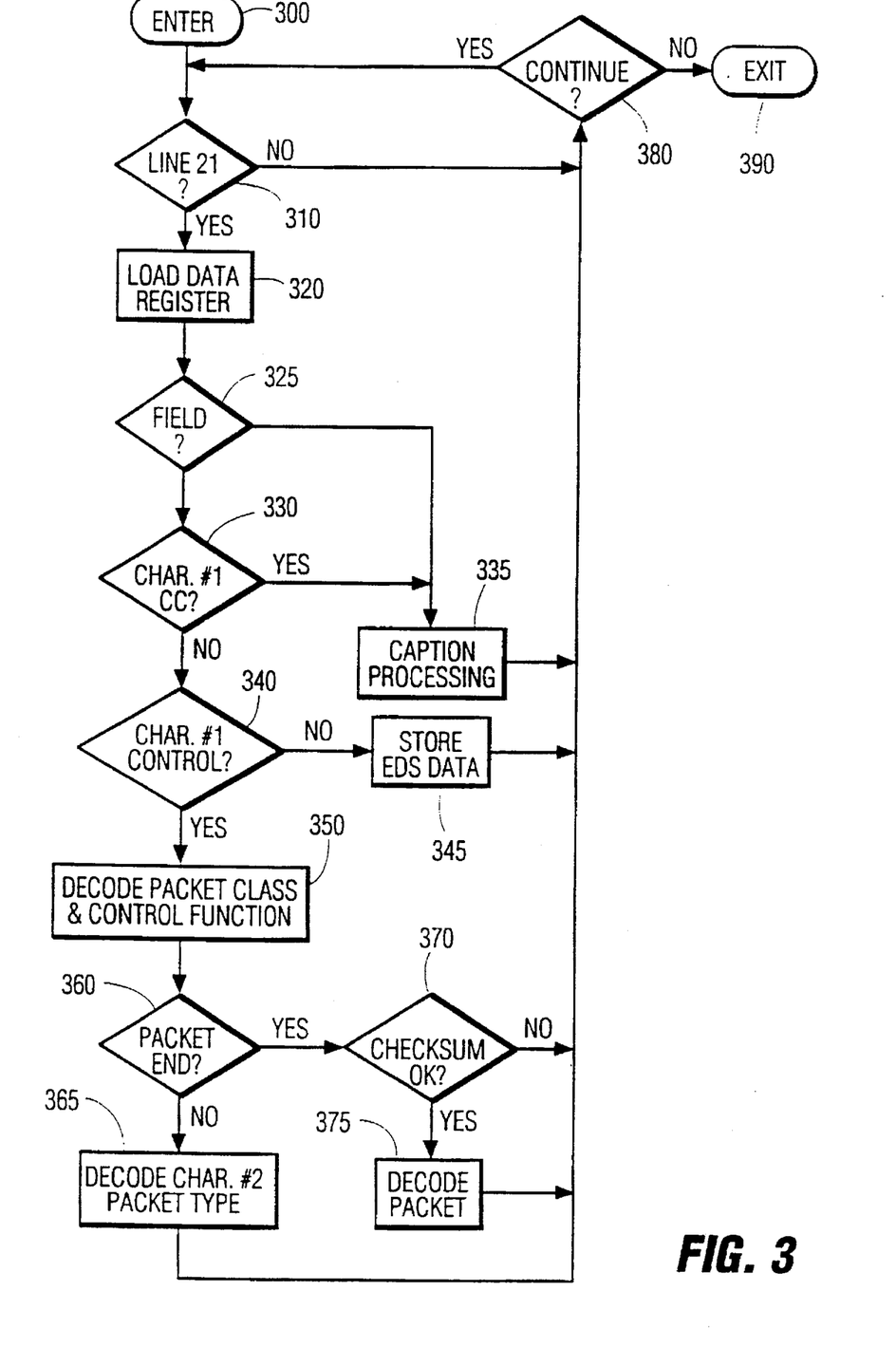
FIG. 3 shows a flowchart illustrating the operation of the system shown in FIG. 2.

In FIG. 3, processing begins at step 300 in FIG. 3 when closed caption or EDS processing is enabled by events such as the receiver being turned on or activation of EDS capability by a user (e.g., via a remote control button). Operation pauses at step 310 until a line 21 interval is detected. This indication may be provided, for example, by signal LINE21 in FIG. 2. At step 320 in FIG. 3, serial data from line 21 is loaded into a data register (e.g., register 210 in FIG. 2). Next, the current field is determined at step 325 by, e.g., testing signal FIELD in FIG. 2. If the current field is field 1, the data in the data register cannot represent EDS data, and operation continues at step 335 where the register data is processed as closed caption data.

At step 325, if the current field is field 2, operation continues at step 330 where CHAR #1 is evaluated to determine if CHAR #1 is closed caption data in field 2. If CHAR #1 is closed caption data, step 335 is executed where the data is processed as closed caption data. For example, closed caption characters are transferred to an OSD processor for subsequent display. If CHAR #1 is not closed caption data at step 330, CHAR #1 is presumed to be EDS data and operation proceeds to step 340. At step 340, CHAR #1 is tested to determine if CHAR #1 represents an EDS control code. If CHAR #1 is not an EDS control character at step 340, the character is EDS data that is stored in memory at step 345.

Detection of an EDS control code at step 340 is followed by decoding of CHAR #1 at step 350 to determine the EDS packet function and packet class. Signals PFUNC and PCLASS in FIG. 2 are generated at step 350. The packet function is tested further at step 360 to determine whether the packet function indicates the end of the packet. If the function is not "end packet", CHAR #2 is decoded at step 365 to determine the packet type. Signal PTYPE in FIG. 2 is generated at step 365. If the end of the packet is detected at step 360, the checksum in CHAR #2 is tested at step 370 to detect errors in the packet data. The packet data is processed further at step 375 if no errors are detected by, for example, decoding control information in the packet data to generate control signals for the system or storing the packet data for later use, such as in the case of program title information, activated by a user.

Following steps 310, 335, 345, 365, 370, and 375 in FIG. 3, operation continues at step 380 where the system checks to determine if auxiliary video information (i.e. CC or EDS data) processing remains enabled. If enabled, operation continues by searching for the next occurrence of line 21 at step 310. If disabled, the procedure in FIG. 3 is exited at step 390.

The described system processes auxiliary video information formatted in a predetermined manner to facilitate determining whether the information in line 21 is closed caption or EDS information. An exemplary EDS data formatting specification suitable for use with the embodiment depicted in FIG. 2 is described below.

1. General EDS Data Format Information

The encoding of information for the extended data services (EDS) follows the same general format as for closed caption data encoding. This scheme consists of pairs of characters transmitted in the same field. The characters can be either a control code pair or a data pair. The first byte of the pair determines whether the pair is a control pair or a data pair. If the first byte is in the range of 01 h to 0 Fh, the pair is a control pair. These values are not defined for captioning or text transmission. Upon receiving such a control code pair, the decoder would recognize subsequent data as EDS data. This is the same scheme that is used when decoding a closed caption signal to differentiate between caption and text mode, and between operating channel 1 and operating channel 2 (i.e. C1 and C2) of the caption signal. All characters are transmitted using odd parity. This is consistent with the closed caption conventions, and allows for simpler encoding/decoding hardware and software.

There are four varieties of EDS characters: Control, Type, Data, and Checksum. These characters may be transmitted in the combinations shown in Table 1.

TABLE 1

| 1$^{st}$ Byte | 2$^{nd}$ Byte |
| --- | --- |
| Control | Type |
| Control | Data |
| Data | Data |
| Control | Checksum |

As described above, the Control byte is in the range of 01 h to 0 Fh. The Type and Checksum bytes are in the range of 00 h to 7 Fh. The data byte is in the range of 10 h to 7 Fh for ASCII data, or in the range of 40 h to 7 Fh for Non-ASCII data. A Data byte of 00 h is a null byte, and is always ignored.

A packet of EDS data is defined to be a collection of these pairs of bytes which conveys a complete piece of information. Each byte of EDS data is associated with a packet of data. A sub-packet is defined to be a control pair followed by some number, maybe zero, of data pairs. A data field is defined to be some number of bits within a Data byte. Each sub-packet may be transmitted independently and surrounded by other information. Note that a full packet could be transmitted using only control pairs, or by also using data pairs for more throughput when possible.

There are three categories of Control bytes: Start, Continue, and End. The Start code indicates the beginning of a new packet. The Continue code indicates the following data is part of the packet which began with the last Start code. The End code indicates the packet is finished. The Type byte always follows the Start code to indicate the type of data contained in the new packet. The Checksum byte always follows the End code and is used for error detection.

Once a packet has been started, the data for the packet can be sent one byte at a time by using a Continue code with each byte to create a separate sub-packet for each byte. Each subpacket occurs during a single instance of line 21. For higher throughput, both bytes during a particular line 21 interval may contain data. In this case, a sub-packet includes data from a plurality of line 21 intervals. The data in a particular line 21 interval belongs to the sub-packet which began with the last Start or Continue code. The transmission of data pairs can not be interrupted by any other information. If it is necessary to interrupt the transmission of data pairs, the transmission of the packet is reestablished by sending a Continue control pair. The example shown in Table 2 illustrates the described process.

TABLE 2

| 1st Byte | 2nd Byte |
|---|---|
| ... other ... | ... other ... |
| Start | Type |
| Data | Data |
| ... other ... | ... other ... |
| Continue | Data |
| Data | Data |
| Data | Data |
| ... other ... | ... other ... |
| Continue | Data |
| ... other ... | ... other ... |
| End | Checksum |
| ... other ... | ... other ... |

The described approach will allow broadcasters the flexibility to simultaneously use any combination of captions or text using either C1 or C2, and EDS. It also permits the efficient transmission of EDS information if it is the only service offered on field two of the video signal.

There are four classes of packets currently defined: Current, Future, Network, and Miscellaneous. The Current packet contains information describing the program currently being transmitted. The Future packet contains information about an upcoming program to be transmitted. The Network packet contains information about the source of the video signal, e.g. the broadcasting network. The Miscellaneous packet contains a variety of other useful information. Table 3 shows the assignment of these packet classes to their respective control codes.

TABLE 3

| Control Code | Function | |
|---|---|---|
| 01h | Current | Start |
| 02h | Current | Continue |
| 03h | Current | End |
| 04h | Future | Start |
| 05h | Future | Continue |
| 06h | Future | End |
| 07h | Network | Start |
| 08h | Network | Continue |
| 09h | Network | End |
| 0Ah | Misc. | Start |
| 0Bh | Misc. | Continue |
| 0Ch | Misc. | End |
| 0Dh | | Reserved |
| 0Eh | | Reserved |
| 0Fh | | Reserved |

The transmission of one class of packet may be interrupted by another class of packet because each of the four packet classes has its own group of control codes. As a result, higher priority information can interrupt lower priority information. For example, information about the current program is probably more time critical than is information regarding a future program. A complete packet of "current" information might be sent in the middle of transmitting a packet of "future" information. Thus, single fields of lower priority information can be inserted when unused line 21 intervals are available. However, a packet can only be interrupted by a packet of a different class. This ensures that packets can be "nested" without confusion regarding which packet data is to be associated with when a "continue" control code is issued.

Each packet conveys one piece of information. The first byte of the control code pair that begins a packet (i.e. "start" control code) determines the packet class as shown in Table 3. The type of information contained in the packet is determined by the Type code in byte two of the Start control code pair. The data bytes associated with a packet are held in temporary storage until the entire packet has been received and the checksum at the end of the packet has been validated. This prevents stored data from being corrupted, and also permits a packet to be aborted in the middle by starting a new packet of the same class.

The data types included in Current and Future packet classes are identical, i.e. the Type designations for both packets is the same. The difference between the Current and Future classes is the "object" of the data, i.e. "current" or "future" program. Any information regarding the current program which can be transmitted via EDS can also be sent in regard to a future program, and vice versa. The data contained in the Future packet always pertains to the "future" program that was most-recently specified in the EDS information. The future program is specified by sending a program identifier as the Type code in a Future packet. This Type code indicates which future program all transmitted information is to pertain to until another program identifier Type code is sent. Similarly, the information in the Current packet class always pertains to the program currently being transmitted. When a new program identifier is sent in a Current packet, the old program has finished and the newly specified program is beginning.

The data which constitutes the program identifier is simply the scheduled broadcast time, date, and receiver channel number. This has the advantage of being a compact, simple to calculate, and unique identifier for each program broadcast on a given channel per year. Even if the broadcast of a program is delayed, it should still carry its originally scheduled time as its program identifier data throughout its entire broadcast. This will allow the recording of programs which are delayed or run longer than expected. All time and date specifications, including current time and date, are always given as Greenwich Mean Time (GMT). Providing both the start time of a future program and the current program identifier as GMT ensures that the identification of a desired program will be independent of the viewer's time zone and "daylight saving" time status. This permits correct recording, e.g. in a video cassette recorder (VCR), even if the viewer does not tell his VCR what time zone he is in. The only purpose for specifying the viewer's time zone and daylight saving status is to display the correct local time given the broadcast time as GMT.

2. Current and Future Packet Classes

Table 4 shows the assignment of Type codes in the Current and Future packet classes.

TABLE 4

| Type Code | Function |
|---|---|
| 00h | Unidentify Program |
| 01h | Program identifier |
| 02h | Erase Program |
| 03h | Stop Time |
| 04h | Program Title |
| 05h | Program Audience |
| 06h | Program Type |
| 07h | Audio Services |

TABLE 4-continued

| Type Code | Function |
|---|---|
| 08h | Caption Services |
| 09h | - undefined - |
| 0Ah | - undefined - |
| . | . |
| . | . |
| . | . |
| 78h | Description 8 |
| . | . |
| . | . |
| . | . |
| 7Fh | Description 1 |

2.1 "Unidentify Program" Packet Type

This packet contains zero bytes, but indicates the program is to be unidentified. It has the opposite effect of the program identifier packet. When received, all subsequent packets of this class will be ignored until another program identifier is received. This could be used as a signal that the specified program information has all been sent.

2.2 "Program Identifier" Packet Type

This packet contains either four or six bytes which define a program start time and date, relative to Greenwich Mean Time, and receiver channel number. The format of each byte is shown in Table 5. Note that bit #6 in each byte is always set to logic 1 because the information in each byte is not ASCII data. Also, note that the bit #7 (bit b7) is not shown in Table 5, or other tables below, because bit #7 of each byte is a parity bit.

TABLE 5

| Data | $b_6$ | $b_5$ | $b_4$ | $b_3$ | $b_2$ | $b_1$ | $b_0$ |
|---|---|---|---|---|---|---|---|
| minute | 1 | $m_5$ | $m_4$ | $m_3$ | $m_2$ | $m_1$ | $m_0$ |
| hour | 1 | T | $h_4$ | $h_3$ | $h_2$ | $h_1$ | $h_0$ |
| day | 1 | D | $d_4$ | $d_3$ | $d_2$ | $d_1$ | $d_0$ |
| month | 1 | Z | L | $m_3$ | $m_2$ | $m_1$ | $m_0$ |
| channel | 1 | $c_5$ | $c_4$ | $c_3$ | $c_2$ | $c_1$ | $c_0$ |
| channel | 1 | $s_1$ | $s_0$ | — | — | $c_7$ | $c_6$ |

The minute data field has a valid range from 0 to 59, the hour field from 0 to 23, the day field from 1 to 31, and the month field from 1 to 12. The "D" bit determines if daylight saving time is currently being observed throughout the country. The "L" bit determines if the current year is a leap year. The "Z" bit determines if the current time in seconds should be reset to zero. The "D", "L", and "Z" bits are ignored by the decoder when processing this packet (see the description of the "time of day" Type code assignment in the section below that pertains to the Miscellaneous packet class). The "T" bit is processed as part of the program identifier packet to determine if the program is subject to a local tape delay. Even if the broadcast of a program is delayed, it should still carry its originally scheduled time as its program identifier data throughout its entire broadcast.

The "channel" data field is an optional two-byte field having a valid range from 0 to 255. If the channel field is omitted, the receiver channel will default to the currently tuned channel. The channel field allows one channel to specify information for another channel. The channel data field contains a two bit subfield which specifies the source input. The source subfield has a valid range from 1 ($S_1S_0=00$) to 4 ($S_1S_0=11$) that can be used in a multi-wire cable system to specify the cable line.

2.3 "Erase Program" Packet Type

This packet contains zero bytes, but indicates the specified program data is to be completely deleted. This will be most useful for the Future packet class.

2.4 "Stop Time" Packet Type

This packet contains either zero or four bytes which define a program stop time and date relative to Greenwich Mean Time. If the packet contains zero bytes, the existing stop time will be erased. The format of the bytes is the same as for the "program identifier" packet described above in section 2.2 except that no channel data is needed. The "D", "L", and "Z" bits are also ignored by the decoder when processing this packet as described in section 2.2.

2.5 "Program Title" Packet Type

This packet contains a variable number, 0 to 32, of bytes which define a program title. If the packet contains zero bytes, the existing program title will be erased. Each byte is an ASCII character in the range of 20 h to 7 Fh. The variable size of this packet allows for efficient transmission of titles of any length. No "size" indicator byte is needed because the End control code pair is used to terminate the packet.

2.6 "Program Audience" Packet Type

This packet contains a variable number of bytes, namely zero to three, which define the intended audience for the program. If the packet contains zero bytes, the existing program audience will be erased. For any data bytes in this packet, bit #6 is set to logic 1 because the data is not ASCII data. The format of the data bytes is shown in Table 6.

TABLE 6

| $b_6$ | $b_5$ | $b_4$ | $b_3$ | $b_2$ | $b_1$ | $b_0$ |
|---|---|---|---|---|---|---|
| 1 | M | W | S | A | T | C |
| 1 | D | — | V | L | N | A |
| 1 | $q_2$ | $q_1$ | $q_0$ | $r_2$ | $r_1$ | $r_0$ |

The data bytes in this packet must be sent in the order shown in Table 6. Table 7 defines the function of the bits for bytes one and two shown in Table 6.

TABLE 7

| Byte One | | Byte Two | |
|---|---|---|---|
| C | Children | A | Adult Situations |
| T | Teens | N | Nudity |
| A | Adults | L | Language |
| S | Seniors | V | Violence |
| W | Women | — | undefined |
| M | Men | D | Data Services |

Bit definitions may be selected from the list in Table 7 in any combination that is needed to communicate the desired information. Byte one indicates the target audience. For example, to specify a program as suitable for the entire family, all bits in byte one would be set. Byte two indicates why the target audience may have been restricted from the entire family.

Byte three in Table 6 contains data fields representing program quality and rating information for movies. The format for byte three is shown in Table 8.

TABLE 8

| $q_2$ | $q_1$ | $q_0$ | Quality | $r_2$ | $r_1$ | $r_1$ | Rating |
|---|---|---|---|---|---|---|---|
| 0 | 0 | 0 | Unknown | 0 | 0 | 0 | Unknown |
| 0 | 0 | 1 | * | 0 | 0 | 1 | G |
| 0 | 1 | 0 | *½ | 0 | 1 | 0 | PG |
| 0 | 1 | 1 | * * | 0 | 1 | 1 | PG-13 |
| 1 | 0 | 0 | * *½ | 1 | 0 | 0 | R |
| 1 | 0 | 1 | * * * | 1 | 0 | 1 | NC-17 |
| 1 | 1 | 0 | * * *½ | 1 | 1 | 0 | X |
| 1 | 1 | 1 | * * * * | 1 | 1 | 1 | None |

2.7 "Program Type" Packet Type

This packet contains a variable number, 0 to N, of bytes which specifies the type of information included in a particular program. The information in this packet could be used by a viewer to selectively look for certain types of programs. If the packet contains zero bytes, the existing program type will be erased. The first two bytes are not ASCII data and, therefore, bit #6 is set to logic 1 in the first two bytes. The third through $N^{th}$ bytes are ASCII characters in the range of 20 h to 7 Fh.

The format of the first two bytes is shown in Table 9.

TABLE 9

| $b_6$ | $b_5$ | $b_4$ | $b_3$ | $b_2$ | $b_1$ | $b_0$ |
|---|---|---|---|---|---|---|
| 1 | N | S | E | E | L | C |
| 1 | $f_1$ | $f_0$ | $t_1$ | $t_0$ | $s_1$ | $s_0$ |

The first two bytes must be sent in the order shown in Table 9.

The first byte defines the general category of the information in the program. The type of information indicated by the bits in the first byte is shown in Table 10.

TABLE 10

| C | Classified |
|---|---|
| L | Life/Style |
| E | Education |
| E | Entertainment |
| S | Sports |
| N | News |

A logic 1 in a bit position shown in Table 9 indicates that the program provides the corresponding type of information listed in Table 10. If necessary, multiple bits can be set to logic 1 to indicate that the program includes multiple categories of information. Byte two provides additional program information as shown in Table 11.

TABLE 11

| $f_1$ | $f_0$ | Format | $t_1$ | $t_0$ | Time Slot | $s_1$ | $s_0$ | Status |
|---|---|---|---|---|---|---|---|---|
| 0 | 0 | Special | 0 | 0 | Once | 0 | 0 | Premiere |
| 0 | 1 | Series | 0 | 1 | Once Week | 0 | 1 | Live |
| 1 | 0 | Mini-Series | 1 | 0 | Weekdays | 1 | 0 | Tape Delay |
| 1 | 1 | Movie | 1 | 1 | Every Day | 1 | 1 | Re-Run |

Bytes three to N provide additional information which can be used to further specify the type of programming. These bytes are sent as ASCII characters, but the character codes represent the words listed in Table 12.

TABLE 12

| Code | Qualifier |
|---|---|
| 20h | Unknown |
| 21h | Action/Adventure |
| 22h | Amatuer |
| 23h | Animated |
| 24h | Arts |
| 25h | Auto |
| 26h | Awards |
| 27h | Baseball |
| 28h | Basketball |
| 29h | Bowling |
| 2Ah | Boxing |
| 2Bh | Business |
| 2Ch | Cartoon |
| 2Dh | Classical |
| 2Eh | Comedy |
| 2Fh | Commercial |
| 30h | Computer |
| 31h | Concert |
| 32h | Contemporary |
| 33h | Criminal |
| 34h | Dancing |
| 35h | Diving |
| 36h | Documentary |
| 37h | Drama |
| 38h | Erotica |
| 39h | Fantasy |
| 3Ah | Fiction |
| 3Bh | Financial |
| 3Ch | Football |
| 3Dh | Fund Raiser |
| 3Eh | Game/Quiz |
| 3Fh | Golf |
| 40h | Gymnastics |
| 41h | Helath |
| 42h | Hobby |
| 43h | Hockey |
| 44h | Home |
| 45h | Horor |
| 46h | Hunting/Fishing |
| 47h | Improvement |
| 48h | International |
| 49h | Instructional |
| 4Ah | Investment |
| 4Bh | Legal |
| 4Ch | Local |
| 4Dh | Medical |
| 4Eh | Military |
| 4Fh | Musical |
| 50h | Mystery/Suspense |
| 51h | National |
| 52h | Nature |
| 53h | Opinion |
| 54h | Performing |
| 55h | Personal |
| 56h | Political |
| 57h | Professional |
| 58h | Public |
| 59h | Racing |
| 5Ah | Religious |
| 5Bh | Romance |
| 5Ch | Sales |
| 5Dh | Science |
| 5Eh | Service |
| 5Fh | Shopping |
| 60h | Singing |
| 61h | Skating |
| 62h | Skiing |
| 63h | Soap Opera |
| 64h | Soccer |
| 65h | Special |
| 66h | Talk |
| 67h | Tennis |
| 68h | Text |
| 69h | Track/Field |
| 6Ah | Travel |
| 6Bh | Variety |
| 6Ch | Video |
| 6Dh | Volleyball |
| 6Eh | War |
| 6Fh | Weather |
| 70h | Western |
| 71h | World |
| 72h | Wrestling |
| 73h | special 1 |
| 74h | special 2 |
| 75h | special 3 |
| 76h | special 4 |
| 77h | special 5 |
| 78h | special 6 |

TABLE 12-continued

| Code | Qualifier |
|---|---|
| 79h | special 7 |
| 7Ah | special 8 |
| 7Bh | special 9 |
| 7Ch | special 10 |
| 7Dh | special 11 |
| 7Eh | special 12 |
| 7Fh | Other |

The bytes listed in Table 12 may be used in whatever combination is necessary to specify the desired level of information regarding the type of programming. However, multiple bytes should be sent in proper grammatical order. In addition, it should be noted that receivers may impose limitations on the number of bytes that will be recognized.

The byte designated "Unknown" in Table 12 is the default value if no other bytes from Table 12 are included in the Program Type packet. The twelve "special" bytes listed in Table 12 may be defined by each network to best suit individual programming needs (see the Type code assignments for "special qualifiers" in the section below that describes the Network packet class). The byte designated "Other" in Table 12 indicates that the type of programming is known and does not fit into any of the defined programming types. All twelve of the "special" bytes listed in Table 12 implicitly include the "Other" designation.

2.8 "Audio Services" Packet Type

This packet contains either zero or two bytes which define the contents of the main and second audio programs that are associated with the video signal. If the packet contains zero bytes, existing audio services information will be erased. Bit #6 is set to logic 1 in the data bytes in this packet because the data bytes are not ASCII data. The format of the bytes is shown in Table 13.

TABLE 13

| Data | $b_6$ | $b_5$ | $b_4$ | $b_3$ | $b_2$ | $b_1$ | $b_0$ |
|---|---|---|---|---|---|---|---|
| main | 1 | $l_2$ | $l_1$ | $l_0$ | $t_2$ | $t_1$ | $t_0$ |
| sap | 1 | $l_2$ | $l_1$ | $l_0$ | $t_2$ | $t_1$ | $t_0$ |

Each of the two bytes listed in Table 13 contains two data fields: language and type. The language field of each byte represents the languages listed in Table 14.

TABLE 14

| $l_2$ | $l_1$ | $l_0$ | Language |
|---|---|---|---|
| 0 | 0 | 0 | Unknown |
| 0 | 0 | 1 | English |
| 0 | 1 | 0 | Spanish |
| 0 | 1 | 1 | French |
| 1 | 0 | 0 | German |
| 1 | 0 | 1 | Japanese |
| 1 | 1 | 0 | Other |
| 1 | 1 | 1 | None |

The type field of each byte listed in Table 13 is encoded to represent the information shown in Table 15.

TABLE 15

| Main Audio Program | | | | Second Audio Program | | | |
|---|---|---|---|---|---|---|---|
| $t_2$ | $t_1$ | $t_0$ | Type | $t_2$ | $t_1$ | $t_0$ | Type |
| 0 | 0 | 0 | Unknown | 0 | 0 | 0 | Unknown |
| 0 | 0 | 1 | Mono | 0 | 0 | 1 | Mono |
| 0 | 1 | 0 | Simulated Stereo | 0 | 1 | 0 | Descriptive Video Service |
| 0 | 1 | 1 | True Stereo | 0 | 1 | 1 | Non-program Audio |
| 1 | 0 | 0 | Stereo Surround | 1 | 0 | 0 | Special Effects |
| 1 | 0 | 1 | Data Service | 1 | 0 | 1 | Data Service |
| 1 | 1 | 0 | Other | 1 | 1 | 0 | Other |
| 1 | 1 | 1 | None | 1 | 1 | 1 | None |

2.9 "Caption Services" Packet Type

This packet contains a variable number, 0 to 8, of bytes which define the available forms of caption encoded data. If the packet contains zero bytes, existing information regarding caption serves will be erased. One byte is included to specify each available service. Bit #6 is set to logic 1 in each byte because the data is not ASCII data. Each of the bytes is in the format shown in Table 16.

TABLE 16

| $b_6$ | $b_5$ | $b_4$ | $b_3$ | $b_2$ | $b_1$ | $b_0$ |
|---|---|---|---|---|---|---|
| 1 | $l_2$ | $l_1$ | $l_0$ | F | C | T |

The language data field ($L_2$–$L_0$ in Table 16) is encoded using the same format as for the audio services packet described in section 2.8 above. The "F" bit determines if the data is in TV field one ("F"=0), or in field two ("F"=1). The "C" bit determines if the data is in channel C1 ("C"=0), or in channel C2 ("C"=1). The "T" bit determines if the data is captioning ("T"=0), or text ("T"=1). This information permits the broadcaster to completely specify the line 21 services that are available.

2.10. "Undefined" Packet Types

Type Codes 09h and 0Ah in Table 4 are undefined. These type codes may be defined in the future to further expand EDS capability. For example, one of the undefined type codes might be allocated to provide information regarding video "scrambling". Various approaches are used for encoding, or scrambling, a video signal to prevent viewing by unauthorized users, e.g. "pay-per-view" programming. Information regarding the type of scrambling might be useful to permit authorized users to more effectively decode the scrambled signal.

Another possible use for the undefined codes is to provide information regarding the aspect ratio of the video image in a program. Aspect ratio information would permit the system to select only certain aspect ratio programs. Alternatively, the video receiver could use the aspect ratio information to adapt the signal to the particular display screen aspect ratio of the video receiver.

2.11. "Description 'N'" Packet Type

These packets each contain a variable number, 0 to 32, of bytes which, when combined together, form a description of the program. If the packet contains zero bytes, the existing line of description information will be erased. Each byte is an ASCII character in the range of 20 h to 7 Fh. Each packet of this type provides one line of a multiple line description of the program. The description can contain any information the service provider chooses including: episode title, date of release, cast of characters, brief story synopsis, etc. By varying the number of packets of Description "N" type, efficient transmission of program descriptions of any length is possible.

3. Network Packet Class

Table 17 lists the assignment of Type codes for the Network packet class.

TABLE 17

| Type Code | Function |
|---|---|
| 00h | Unidentify Network |
| 01h | Network Identifier |
| 02h | Erase All Programs |
| 03h | Network Name |
| 04h | Call Letters |
| 05h | Native Channel |
| 06h | Tape Delay |
| 07h | Special Qualifier 1 |
| . | . |
| . | . |
| . | . |
| 12h | Special Qualifier 12 |

3.1. "Unidentify Network" Packet Type

This packet contains zero bytes and indicates that the network is to be "unidentified". The effect is opposite to that of the "network identifier" packet (see section 3.2 below). After this packet is received, all subsequent packets of the Network class will be ignored until a network identifier packet is received. This packet type can be used as a signal that all network information has been sent.

3.2. "Network Identifier" Packet Type

This packet contains either zero or two bytes which define a receiver channel number for which network information is to be specified. The format of the bytes is the same as for the channel data field shown in Table 5 in section 2.2 above. The two byte channel field is optional. The receiver channel will default to the currently tuned channel if not specified. This field allows one channel to specify information for another channel.

3.3 "Erase All Programs" Packet Type

This packet contains zero bytes, but indicates all of the program information for the specified network is to be completely deleted.

3.4. "Network Name" Packet Type

This packet contains a variable number, 0 to 32, of bytes which define the name of the broadcasting network. If the packet contains zero bytes, the existing network name is erased. Each byte is an ASCII character in the range of 20 h to 7 Fh. Each network should use a single unique name so that receivers can access information regarding the network that is stored internal to the receiver, e.g. a network logo that can be displayed when a network is selected.

3.5. "Call Letters" Packet Type

This packet contains a variable number, 0 to 32, of bytes which define the "call" letters of the local broadcasting station. If the packet contains zero bytes, the existing call letters are erased. Each byte is an ASCII character in the range of 20 h to 7 Fh.

3.6. "Native Channel" Packet Type

This packet contains either zero or two bytes which define the "native" channel number, i.e. local "over-the-air" broadcast channel number, that is assigned to a station. This information is useful if a cable channel number assigned to a station differs from the station's over-the-air broadcast channel number. If the packet contains zero bytes, the existing native channel number is erased. The format of the bytes is the same as for the channel field listed in Table 5 in section 2.2 above.

3.7. "Tape Delay" Packet Type

This packet contains either zero or one byte which defines the number of half hours the local station routinely tape delays network programs. If the packet contains zero bytes, the existing tape delay information is erased. The data is not ASCII data so bit #6 is always set to logic 1. The format of the data byte in this packet is shown in Table 18.

TABLE 18

| $b_6$ | $b_5$ | $b_4$ | $b_3$ | $b_2$ | $b_1$ | $b_0$ |
|---|---|---|---|---|---|---|
| 1 | S | $d_4$ | $d_3$ | $d_2$ | $d_1$ | $d_0$ |

The delay field ($d_4$-$d_0$ in Table 18) has a valid range from 0 to 31, which represents time values from 0 hours and 0 minutes to 15 hours and 30 minutes in 30 minute increments. The "S" bit is a sign bit, and determines if the delay value is to be added to the expected program start time ("S"=0) or subtracted from it ("S"=1). This delay would apply to all programs on the channel which have the "T" bit set in their program identifier information (see Table 5 in section 2.2 above). The delay value defaults to zero if not specified.

3.8. "Special Qualifier 'N'" Packet Type

These packets each contain a variable number, 0 to 32, of bytes which define the text to be associated with the "special" bytes listed in Table 12 that may be used for specifying program information. If the packet contains zero bytes, the text associated with a "special" byte is erased. Each byte in this packet type is an ASCII character in the range of 20 h to 7 Fh. Each packet provides text for one network specific "special" program information byte. For example, a station which offers mostly sports may define its first five "special" bytes to represent sports such as: Poker, SCUBA, Hang Gliding, Americas Cup, and Olympics. However, a station which offers mostly music may define its first five "special" bytes to represent types of music such as: Heavy Metal, Rap, Pop, Country, and Disco. The meaning of the "special" bytes can be redefined by the network at any time. If no text is received to define a "special" byte, the byte will default to a single blank space.

4. Miscellaneous Packet Class

Table 19 lists the assignment of Type codes for the Miscellaneous packet class.

TABLE 19

| Type Code | Function |
|---|---|
| 01h | Time of Day |
| 02h | Time Zone |
| 03h | Line Number |
| 04h | No EDS |
| 05h | Single EDS |
| 06h | Directory EDS |
| 07h | Program Pause |
| 08h | Program Resume |
| 09h | Impulse Capture |

4.1. "Time of Day" Packet Type

This packet contains four data bytes which define the current time of day and date relative to Greenwich Mean Time. The format of the bytes is the same as that shown in Table 5 for the "program identifier" packet (see section 2.2 above), except that no channel data is needed. The "D" bit is used to determine if daylight savings time is currently being observed throughout the country. This information, along with the viewer's specified time zone and whether daylight savings time is locally observed, is used to determine the correct local time. Local time is only used to display the local time for the viewer. All internal timers and clocks should be kept in Greenwich Mean Time.

The "L" bit is used to determine if the current year is a leap year. This is needed to determine if the local day is February 28th or 29th when it is March 1st Greenwich Mean Time. The "Z" bit is used to determine if the current time in seconds should be reset to zero. This allows the time of day to be correct without transmitting the full six bits of data to specify the current number of seconds. The "T" bit is used to determine if the program is subject to a local tape delay. If this bit is set, the time of day clock should not be updated.

4.2. "Time Zone" Packet Type

This packet contains one byte which defines the viewer's time zone and daylight savings status. The data is not ASCII data so bit #6 is always set. The format of the single data byte is shown in Table 20.

TABLE 20

| $b_6$ | $b_5$ | $b_4$ | $b_3$ | $b_2$ | $b_1$ | $b_0$ |
|---|---|---|---|---|---|---|
| 1 | D | $h_4$ | $h_3$ | $h_2$ | $h_1$ | $h_0$ |

The hour data field (bits $h_4$–$h_0$ in Table 20) has a valid range from 0 to 23 and represents the nominal delay in hours relative to GMT. The "D" bit determines if daylight savings time is to be observed. This packet should only be sent when all possible viewers reside in the same time zone.

4.3. "Line Number" Packet Type

This packet contains one byte which defines the current line number and field for the tuned channel. This data is not ASCII data so bit #6 is always set. The format of the byte is shown in Table 21.

TABLE 21

| $b_6$ | $b_5$ | $b_4$ | $b_3$ | $b_2$ | $b_1$ | $b_0$ |
|---|---|---|---|---|---|---|
| 1 | F | $l_4$ | $l_3$ | $l_2$ | $l_1$ | $l_0$ |

The "line" field (bits $L_4$–$L_0$ in Table 21) has a valid range from 7 to 31. The "F" bit determines if the data is in TV field one ("F"=0) or in field two ("F"=1).

4.4. "No EDS" Packet Type

This packet contains zero bytes and indicates that the tuned channel has no extended data services information available.

4.5. "Single EDS" Packet Type

This packet contains zero bytes and indicates that the tuned channel has extended data services information available for a single channel.

4.6. "Directory EDS" Packet Type

This packet contains zero bytes and indicates that the tuned channel has extended data services information available for multiple channels. This information would be used to identify a station which provides a continuous directory of information about other channels.

4.7. "Program Pause" Packet Type

This packet contains zero bytes and indicates that the current program on the tuned channel has been interrupted. It will need to be retransmitted at least once per minute to maintain a pause. This is because receivers will time-out after one minute even if no program resume packet is sent.

4.8. "Program Resume" Packet Type

This packet contains zero bytes and indicates that the current program on the tuned channel has resumed. It is used to immediately end a program pause. Receivers should perform an automatic program resume if one has not been received within the last minute following a program pause.

4.9. "Impulse Capture" Packet Type

This packet contains either zero, eight, or ten bytes which define a program stop time and date, and start time and date, all relative to Greenwich Mean Time, and receiver channel number. If the packet contains zero bytes, existing information regarding impulse capture is erased. The format of the bytes is the same as for the "stop time" (see section 2.4) followed by the "program identifier" (see section 2.2). This packet provides all the information needed to permit a program to be easily recorded. The program identifier bytes follow the stop time bytes because the program identifier contains a variable number of bytes. The "D", "L", and "Z" bits are ignored by the decoder when processing this packet. The receiver channel will default to the currently tuned channel if not specified.

Figure 4:
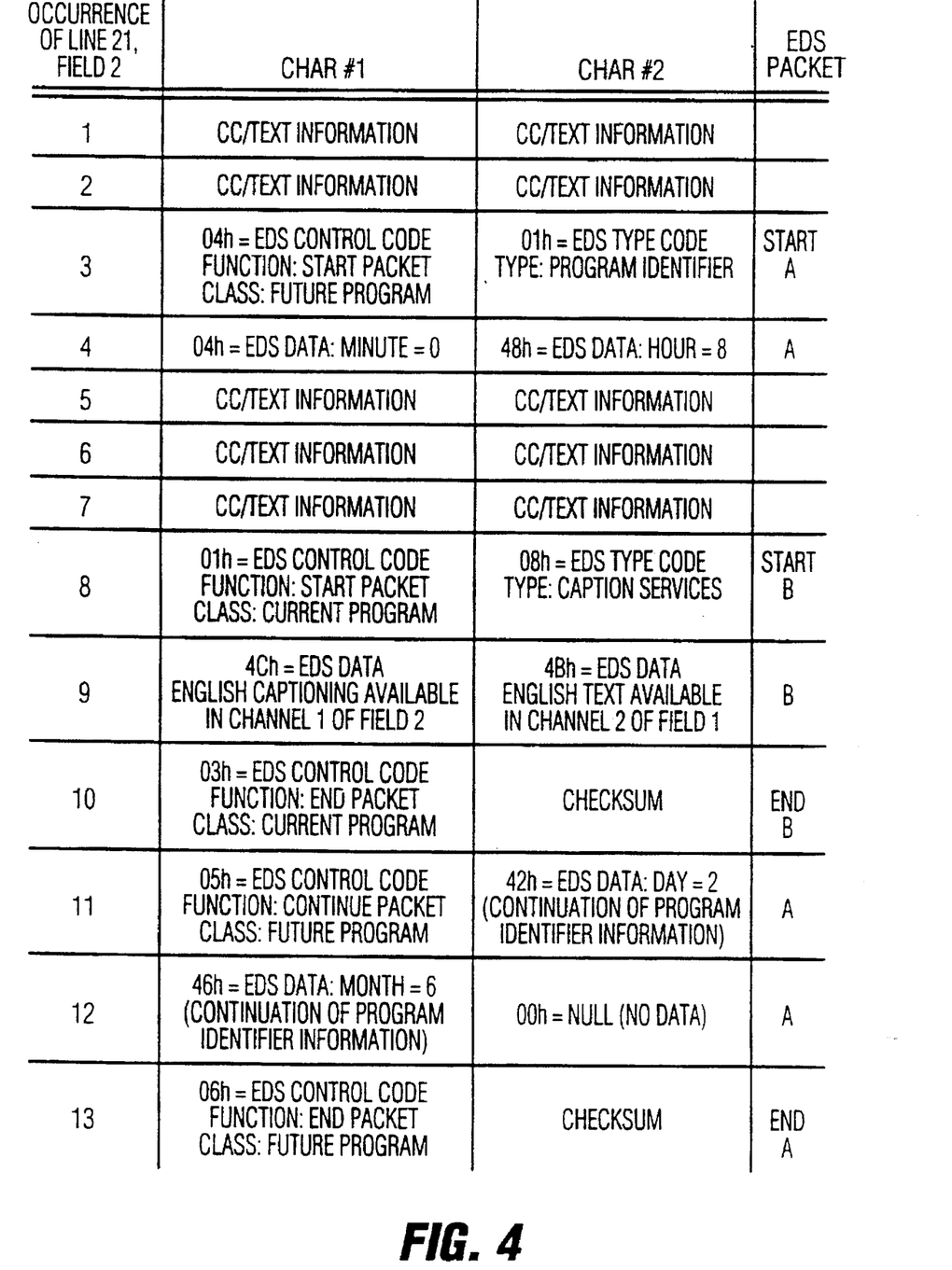
FIG. 4 shows an example of the interleaving of closed caption and extended data services data.

The signal format described above may be better understood by referring to FIG. 4 which shows an example of the interleaving of CC and EDS data, and the nesting of EDS packets. In FIG. 4, the first and second occurrences of line 21 in field 2 (lines labeled "1" and "2" on the left side of FIG. 4) include closed caption or text data. In the third occurrence of line 21 in field 2, packet "A" of EDS data begins with a control code (CHAR #1) and a type code (CHAR #2). The fourth occurrence of line 21 includes EDS data that is part of packet "A". The fifth, sixth, and seventh occurrences of line 21 in field 2 are closed caption data. Because the EDS data at the start of packet A acts as a break in the CC data, the CC data at line 5 in FIG. 4 begins with a "resume closed caption" control code to distinguish the closed caption data from the EDS data.

A second EDS packet, labeled packet "B" in FIG. 4, begins at the eighth occurrence of line 21 and ends at the tenth occurrence of line 21. Packet "B" is nested within packet "A" which continues at the eleventh occurrence of line 21 with a "continue" control code. Packet "A" ends at the thirteenth occurrence of line 21. The end of packet "A" could be followed by another EDS packet, closed caption data, or "null" characters, i.e., no data.

Figure 5:
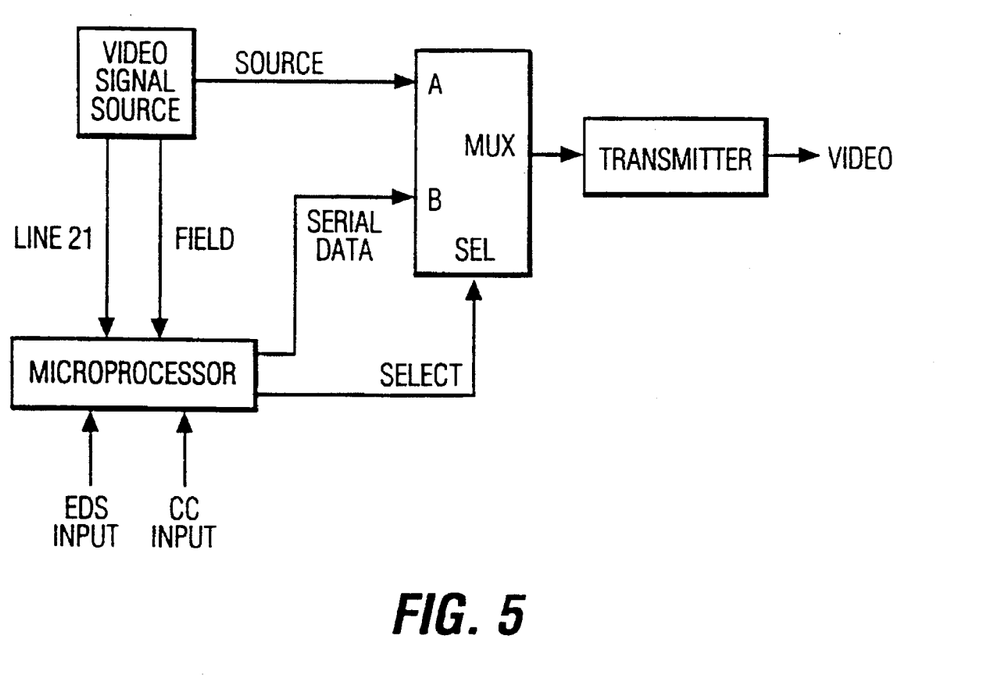
FIG. 5 shows, in block diagram form, a portion of a video signal processing system for generating a video signal including extended data services information.

A video signal including EDS information in the format described above can be generated using the exemplary system shown in FIG. 5. Referring to FIG. 5, video signal source 510 providing signal SOURCE may be a video tape recorder or video camera. Signals LINE21 and FIELD from unit 510 correspond to signals of the same name in FIG. 2 and synchronize the operation of the system in FIG. 5 to signal VIDEO. Microprocessor 520 receives EDS and CC input data identified as EDS INPUT and CC INPUT, respectively, in FIG. 5 and formats it into serial data signal SERIAL DATA. The CC and EDS input data may be generated, for example, by someone typing CC and/or EDS information such as a program title at a keyboard.

MUX 530 selectively couples either signal SOURCE or signal SERIAL DATA to transmitter 540 in response to signal SELECT from microprocessor 520. Transmitter 540 transmits signal VIDEO over cable or by broadcasting. Output signal VIDEO in FIG. 5 corresponds to signal VIDEO in FIG. 2. CC and EDS data is inserted into signal VIDEO in FIG. 5 by the operation of MUX 530. When CC or EDS data is to be inserted, microprocessor 520 detects an occurrence of line 21 in the appropriate field via signals LINE21 and FIELD and generates signal SELECT to cause MUX 530 to couple signal SERIAL DATA to transmitter 540. Microprocessor 520 then outputs the CC or EDS data on signal SERIAL DATA causing the CC or EDS data to be included in signal VIDEO via transmitter 540.

Microprocessor 540 controls the priority of insertion of CC and EDS data. For example, CC data has higher priority than EDS data because a closed caption display should be synchronized with the actual speech in the video signal. The CC data must be transmitted as required to maintain the desired synchronization. EDS data, however, may be transmitted whenever line 21 intervals are not being used for CC data.

Various modifications of the features described above are possible. For example, future modifications of FCC requirements may permit EDS data to be included in video lines other than line 21 of field 2. In addition, packet classes and types in addition to those described above may be defined. For example, the "reserved" control codes in Table 4 and the "undefined" type codes may be defined in the future. These and other modifications are intended to be within the scope of the following claims.

I claim:

1. Television apparatus comprising:
   means for receiving a television signal including auxiliary information comprising data words; and
   means for processing a first one of said data words for determining control information for controlling processing of said data words and also for determining a class of information to be displayed on a display device; said processing means processing a second one of said data words for determining a subclass of said class of information to be displayed; and said processing means processing a third one of said data words to obtain said information pertaining to said subclass of said class of information to be displayed.

2. The television apparatus of claim 1 wherein
   said television signal includes television program information from one of a plurality of television channels; and
   said class of information determined from said first data word indicates an association of information represented by said third data word with a class of said television program information; one of said classes of information provided by said data words being a current program class of data for providing information relating to television program information currently being provided via one of said plurality of television channels.

3. The television apparatus of claim 2 wherein said class of information determined from said first data word is a future program class indicating that said third data word provides information concerning a television program that will be provided via one of said plurality of television channels at a future time.

4. The television apparatus of claim 3 wherein said first and second data words comprise respective first and second data bytes encoded in non-ASCII format and said third data word comprises a third data byte encoded in ASCII format for representing an alphanumeric character.

5. The television apparatus of claim 3 wherein said second data word represents a particular subclass of information and said particular subclass of information indicates that a television signal from a currently tuned one of said plurality of television channels includes no subclasses of auxiliary information other than said particular subclass.

6. The television apparatus of claim 3 wherein said subclass determined from said second data word indicates that said auxiliary information included in said television signal provides information relating to only one of said plurality of television channels.

7. The television apparatus of claim 3 wherein said subclass determined from said second data word indicates that said auxiliary information included in said television signal provides information relating to more than one of said plurality of television channels.

8. The television apparatus of claim 3 wherein said television signal is partitioned into line intervals which are organized in successive fields; said first, second and third data words occurring successively in one of said line intervals in one of said fields.

9. Television apparatus comprising:
   means for receiving a television signal including television program information and auxiliary information, said auxiliary information comprising data words; and
   means for processing a first one of said data words for determining control information for controlling processing of said data words and also for determining a class of said television program information with which information represented by said data words is associated; said processing means processing a second one of said data words for determining a subclass of said class of television program information with which said information represented by said data words is associated; and said processing means processing a third one of said data words to obtain information pertaining to said subclass.

10. Television apparatus of claim 9 wherein said class of information determined from said first data word comprises one of a current program class and a future program class; said current program class indicating that information represented by said third data word relates to television program information currently included in said television signal; said future program class indicating that information represented by said third data word relates to television program information to be included in said television signal at a future time.

11. The television apparatus of claim 10 wherein said information represented by said third data word comprises information regarding said television program information that is intended for display on a display device.

12. The television apparatus of claim 11 wherein said television signal is partitioned into line intervals which are organized in successive fields; said first and second data words occurring successively in one of said line intervals in one of said fields; said third data word occurring during another one of said line intervals during another one of said fields.

13. The television apparatus of claim 12 wherein each of said first, second and third data words comprises a respective one of first, second and third data bytes; said first and second data bytes being encoded in non-ASCII format and said third data byte being encoded in ASCII format for representing an alphanumeric character.

14. Television apparatus comprising:
    means for receiving a television signal including television program information and including auxiliary information comprising a plurality of data words included in a data packet; said plurality of data words including first, second and third data words occurring successively in the order named in said data packet;
    means for processing said first data word for determining control information for controlling processing of said third data word and also for determining a class of said television program information with which information represented by said third data word is associated; said processing means processing said second data word for determining a subclass of said class of television program information; and said processing means processing said third data word to obtain information pertaining to said subclass.

15. The television apparatus of claim 14 wherein said class of information determined from said first data word comprises one of a current program class and a future program class; said current program class indicating that information represented by said third data word relates to television program information currently included in said television signal; said future program class indicating that information represented by said third data word relates to television program information to be included in said television signal at a future time.

16. The television apparatus of claim 15 wherein said information represented by said third data word comprises information regarding said television program information that is intended for display on a display device.

17. The television apparatus of claim 16 wherein said television signal is partitioned into line intervals which are organized in successive fields; said first and second data words occurring successively in one of said line intervals in one of said fields; said third data word occurring during another one of said line intervals during another one of said fields.

18. The television apparatus of claim 17 wherein each of said first, second and third data words comprises a respective one of first, second and third data bytes; said first and second data bytes being encoded in non-ASCII format and said third data byte being encoded in ASCII format for representing an alphanumeric character.

19. Television apparatus comprising:
means for receiving a television signal partitioned into line intervals which are organized in successive fields; said television signal including television program information and including auxiliary information comprising a plurality of data bytes organized in a data packet; said plurality of data bytes including first, second and third data bytes occurring successively in the order named in said data packet; said first and second data bytes occurring during one of said line intervals during one of said fields and said third data byte occurring during another one of said line intervals during another one of said fields; and
means for processing said first data byte for determining control information for controlling processing of said third data byte and also for determining a class of said television program information with which information included in said third data byte is associated; said processing means processing said second data byte for determining a subclass of said class of television program information; said processing means processing said third data byte to obtain information pertaining to said subclass.

20. The television apparatus of claim 19 wherein said class of information determined from said first data byte comprises one of a current program class and a future program class; said current program class indicating that information represented by said third data byte relates to television program information currently included in said television signal; said future program class indicating that information represented by said third data byte relates to television program information to be included in said television signal at a future time.

21. The television apparatus of claim 20 wherein said information represented by said third data byte comprises information regarding said television program information that is intended for display on a display device.

22. The television apparatus of claim 21 wherein said television signal is partitioned into line intervals which are organized in successive fields; said first and second data bytes occurring successively in one of said line intervals in one of said fields; said third data byte occurring during another one of said line intervals during another one of said fields.

23. The television apparatus of claim 22 wherein each of said first, second and third data words comprises a respective one of first, second and third data bytes; said first and second data bytes being encoded in non-ASCII format and said third data byte being encoded in ASCII format for representing an alphanumeric character.

24. A method of processing a television signal including television program information and including auxiliary information comprising data words, said method comprising the steps of:
receiving said television signal;
processing a first one of said data words for determining control information for controlling processing of said data words;
determining from said first one of said data words a class of said television program information with which information included in said data words is associated;
processing a second one of said data words for determining a subclass of said class of television program information with which said information included in said data words is associated; and
decoding a third one of said data words to obtain decoded information pertaining to said subclass.

25. The method of claim 24 wherein said class of information determined from said first data word comprises one of a current program class and a future program class; said current program class indicating that information represented by said third data word relates to television program information currently included in said television signal; said future program class indicating that information represented by said third data word relates to television program information to be included in said television signal at a future time.

26. The method of claim 25 further comprises the step of displaying the information decoded from said third data word on a display device.

27. The method of claim 26 wherein said television signal is partitioned into line intervals which are organized in successive fields; said first and second data words occur successively in one of said line intervals in one of said fields; said third data word occurs during another one of said line intervals during another one of said fields.

28. The method of claim 22 wherein each of said first, second and third data words comprises a respective one of first, second and third data bytes; said first and second data bytes being encoded in non-ASCII format and said third data byte being encoded in ASCII format for representing an alphanumeric character.

29. A method of processing a television signal including television program information and including auxiliary information comprising a plurality of data packets, each of said data packets including a plurality of data words; said method comprising the steps of:
receiving said television signal;
processing a first data word included in a first one of said plurality of data packets for determining control information for controlling processing of said plurality of data words included in said first data packet and also for determining a class of said television program information with which information included in said first data packet is associated;
processing a second data word included in said first data packet for determining a subclass of said class of television program information with which said information included in said first data packet is associated;
receiving a first data word of a second one of said plurality of data packets after processing said first and second data words of said first data packet and before completing processing of said first data packet;

interrupting processing of said first data packet in response to receiving a first data word of a second one of said plurality of data packets; and processing said second data packet.

30. The method of claim 29 further comprising the steps of:

completing processing of said second data packet; and resuming processing of said first data packet.

31. The method of claim 29 wherein the step of interrupting processing of said first data packet comprises the step of aborting processing of said first data packet.

32. A method of processing a television signal comprising the steps of:

receiving a television signal including television program information and including auxiliary information arranged in packets of digital words;

processing a digital control word included in a first data packet for determining control information;

determining from said control word a class of said television program information with which a digital data word included in said first data packet is associated;

decoding said data word included in said first data packet in response to said control information for determining information pertaining to said class of said television program information;

storing information decoded from said data word in a memory;

erasing said decoded information stored in said memory in response to receiving a second packet comprising a digital control word and no data word.

33. The method of claim 32 wherein control information produced by processing said digital control word included in said first data packet is substantially the same as control information produced by processing said digital control word included in said second data packet.

34. The method of claim 33 wherein each of said digital control words comprises a respective pair of data bytes; a first data byte of said pair of data bytes included in said first data packet exhibits a binary value equal to a binary value of a first data byte of said pair of data bytes included in said second data packet; a second data byte of said pair of data bytes included in said first data packet exhibits a binary value equal to a binary value of a second data byte of said pair of data bytes included in said second data packet.

35. Television apparatus comprising:

means for generating a signal representing television program information;

means for generating an auxiliary information signal comprising first, second and third data words; said first data word providing control information for controlling processing of said third data word and also indicating a class of said television program information; said second data word indicating a subclass of said class of said television program information; said third data word representing information pertaining to said subclass of said television program information;

means for combining said signal representing television program information and said auxiliary information signal to produce a television signal.

36. The apparatus of claim 35 wherein said class of information provided by said first data word comprises one of a current program class and a future program class; said current program class indicating that information represented by said third data word relates to television program information currently included in said television signal; said future program class indicating that information represented by said third data word relates to television program information to be included in said television signal at a future time.

37. The television apparatus of claim 36 wherein said television signal is partitioned into line intervals which are organized in successive fields; said first and second data words occur successively in one of said line intervals in one of said fields; said third data word occurs during another one of said line intervals during another one of said fields.

38. Television apparatus comprising:

means for receiving a television signal including television program information and including auxiliary information comprising data words; and means for processing a first one of said data words for determining whether said data word represents a control code within a first control code range or a control code within a second control code range; said processing means being responsive to said first data word representing said control code within said first control code range for processing said data words to produce information associated with television program information currently included in said television signal; said processing means being responsive to said first data word representing said control code within said second control code range for processing said first data word for determining a class of said television program information with which information included in said data words is associated; said processing means being responsive to said first data word representing said control code within said second control code range for processing a second one of said data words for determining a subclass of said class of television program information with which said information included in said data words is associated; said processing means being responsive to said first data word representing said control code within said second control code range for processing a third one of said data words to obtain information pertaining to said subclass.

39. Television apparatus of claim 38 wherein said class of information determined from said first data word in response to said first data word representing said control code in said second control code range comprises one of a current program class and a future program class; said current program class indicating that information represented by said third data word relates to television program information currently included in said television signal; said future program class indicating that information represented by said third data word relates to television program information to be included in said television signal at a future time.

40. The television apparatus of claim 39 wherein said first data word representing said control code in said first control code range indicates that data words occurring subsequent to said first data word represent closed caption information and said first control code representing said control code in said second control code range indicates that data words occurring subsequent to said first data word represent extended data services information.

* * * * *